Sept. 29, 1931.  F. U. CONARD  1,825,143
COMBINED TYPEWRITING AND COMPUTING MACHINE
Filed July 18, 1925    3 Sheets-Sheet 2
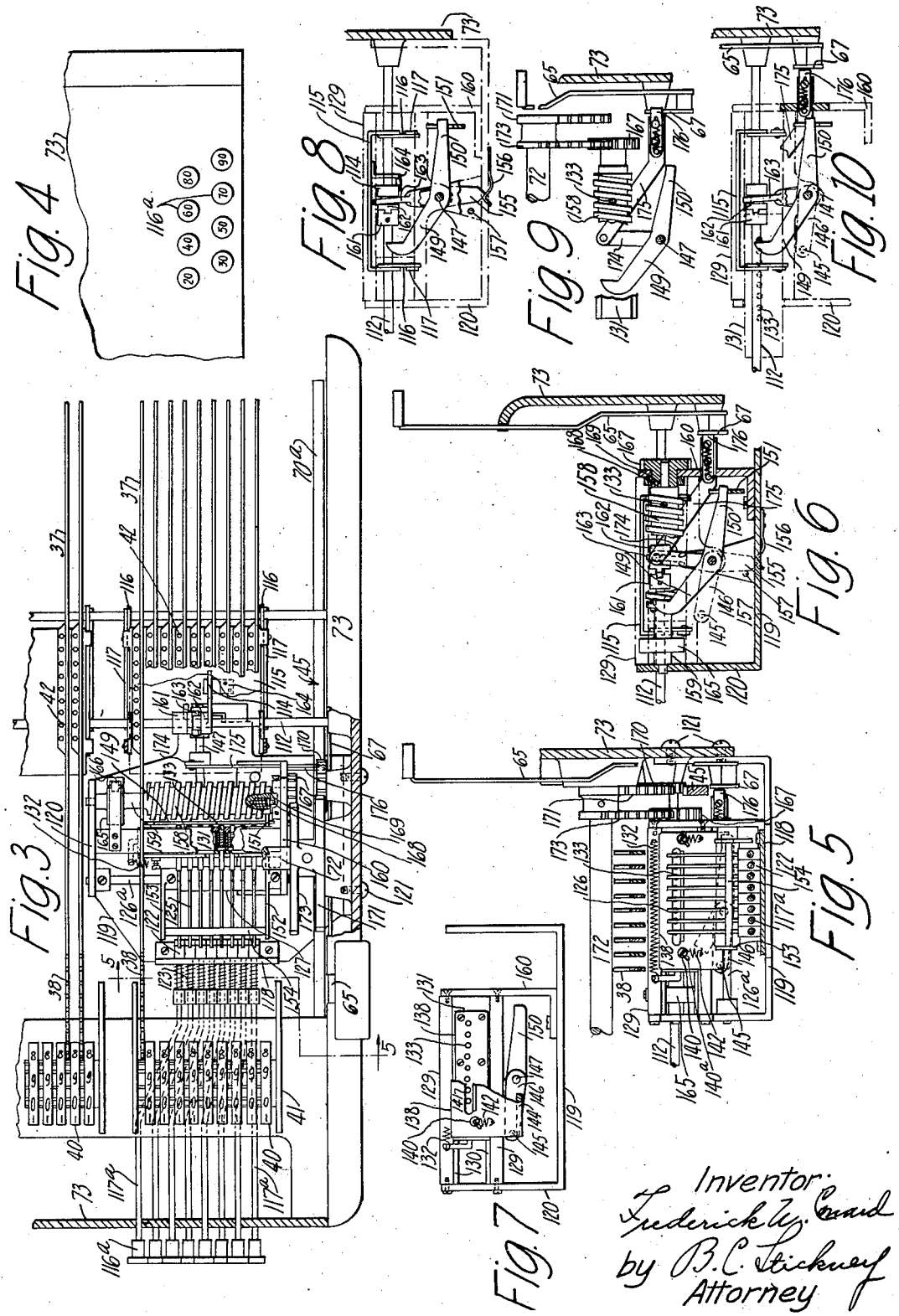

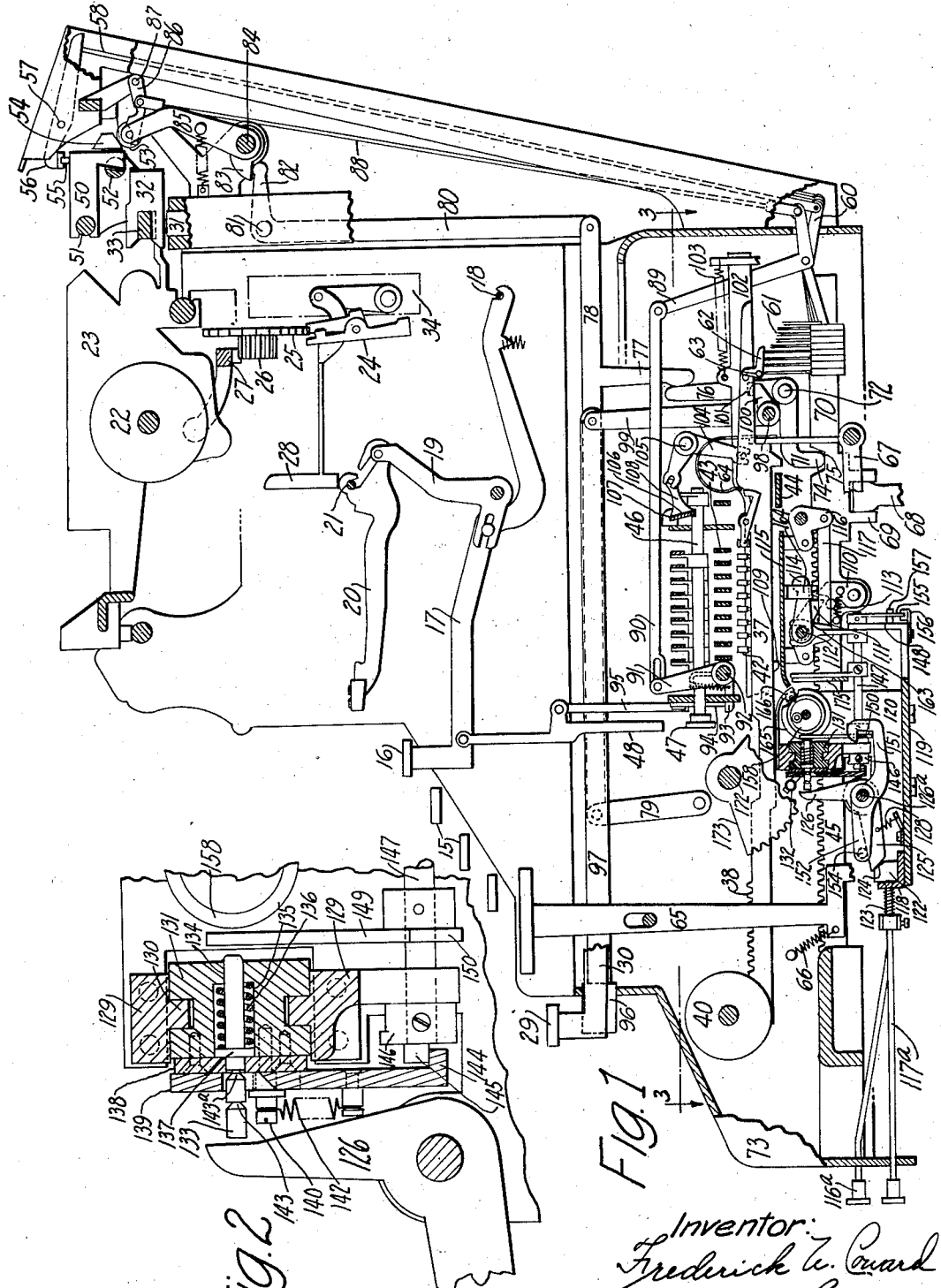

Sept. 29, 1931.    F. U. CONARD    1,825,143
COMBINED TYPEWRITING AND COMPUTING MACHINE
Filed July 18, 1925    3 Sheets-Sheet 3

*Fig. 11*

| COLUMN 1. | COLUMN 2. | | COLUMN 3. |
|---|---|---|---|
| 56 78 | | | —177 |
| 234 90 | | | |
| 891 34 | | | |
| 7 932 00 | 9 115 02 | LESS 10% | 8 203 52 —181 |

REGISTER NO. 2.
```
179—  9 115 02
     -9 115 02
      0 000 00*
```

REGISTER NO. 3.
```
      9 115 02 —179
     - 911 50 —180
      8 203 52* —181
     -8 203 52
      0 000 00
```

ANY REGISTER
```
    3 50 25
    3 50 25
    7 00 50
    3 50 25
  1 0 50 75
    3 50 25
  1 4 01 00
     3 50 25
  1 7 51 25*
```

Inventor:
Frederick U. Conard
by B. C. Stickney
Attorney

Patented Sept. 29, 1931

1,825,143

UNITED STATES PATENT OFFICE

FREDERICK U. CONARD, OF BRIDGEPORT, CONNECTICUT, ASSIGNOR, BY MESNE ASSIGNMENTS, TO ELLIOTT-FISHER COMPANY, OF NEW YORK, N. Y., A CORPORATION OF DELAWARE

COMBINED TYPEWRITING AND COMPUTING MACHINE

Application filed July 18, 1925. Serial No. 44,503.

This invention relates to a combined typewriting and computing machine of a class commercially known as the Underwood-Hanson adding and subtracting or bookkeeping machine, shown and described in the patent to F. A. Hart, No. 1,270,411, dated June 25, 1918, and certain devices are attached thereto to cooperate with existing mechanisms to perform a new operation and produce a new result in this particular type of machine.

The Underwood-Hanson machine provides that computations may be entered into one or more totalizers, and the state of the active totalizer changed at will by the depression of state-controlling keys for subtraction or addition. The depression of numeral-keys sets up digit-pins within reciprocable pin-bars which are operated by a general operator, to run their values into register-wheels, and at the end of each cycle of the general operator a pin-restoring element is brought into operation to restore all the pins to a normal or inoperative state, and, if the same amount is to be repeated, the operator must first reset the index-pins by retyping the numeral.

If one totalizer discloses a total and it is required that a discount be deducted therefrom, the column-selector in the column in which the discount is to be entered is moved or offset one denominational unit of distance to the left of normal, which, in effect, shifts the decimal point one letter-space to the right hand, and, the register having been set to a state for subtraction, upon cycling the general operator, 10 per cent. is deducted from the registered total in that particular totalizer.

If a discount of 20 per cent. is required, the operation of first deducting a 10 per cent. item is required, as just described, but as the general operator restores both the denominational selecting devices and the state-controlling elements for the totalizer to normal at each cycle thereof, the 10 per cent. item must be reset for a second 10 per cent. subtraction operation to get a final total indicating the 20 per cent. deduction. For a 30 per cent. discount, this operation must be repeated a third time, and these second and third operations are necessarily slow and complicated, and few operators would care to attempt a mechanical computation involving a discount of more than the single 10 per cent. deduction.

One feature of the present invention provides key-actuated means that operate to cut out or silence the digit-pin-restoring movement from the general operator for intervals varying from one to eight cycles thereof, and thus preserve a set-up state of the digit-pins during these intervals, so that successive cycles of the general operator will successively transfer an item value to a registered total to be successively added thereto or subtracted therefrom, according to the predetermined state of the register and the predetermined key-set multiple for the item. During the last cycle of the general operator for each key-set multiple of the set-up item, the pin-restoring elements automatically become effective to respond to the movement of said operator to restore the digit-pins to their normal ineffective state, and simultaneously the state-controlling means for the totalizer are restored to normal and the general operator silenced at the end of the cycle in the well-known Underwood-Hanson manner.

Thus, by setting up the digit-pins for a 10 per cent. item of a registered total, setting the totalizer for a state of subtraction, depressing a 50 per cent. discount key or price key, and finally depressing the motor-control key, an automatic mechanical computing operation takes place which includes four consecutive deductions of the 10 per cent. item from the registered total to render a final recorded result in the totalizer, without any thought, attention or mental computation on the part of the operative.

Among the many uses where a machine of this character may be employed, one consists of typing invoices for a line of merchandise that has list prices from which trade discounts are deducted for a net cost for each item. Trade discounts usually are multiples of 10 per cent., and each item has an individual list price and discount, so that each item which is entered on the invoice requires individual discount computations, and this work, which heretofore required more or less mental effort on the part of the operative, can now be done mechanically and with mechanical accuracy and speed.

Another use provides for making out itemized bills of commodities where the rate charged is some multiple of 10, such as 50, 60, 70, 80 or 90 cents per 100 or 1000 cubic feet, square feet, gallons or pieces. A 10 per cent. item of the number of feet, gallons or pieces is rendered, as described, the totalizer set to a state for addition, and a key indicating the multiple of the 10 per cent item, as 50, 60, 70, 80 or 90 is depressed to predetermine the number of cycles for the general operator, and said item will be successively run into the totalizer to give a direct reading of the computation in dollars and cents.

If the rate is $1.20 per, the depression of the "20" key indicates that the 10 per cent. item of a total is to be repeated once. Upon setting the totalizer for addition, the 10 per cent. item will be added to the total twice in succession and the result can be read in dollars and cents for a charge of $1.20 per.

Thus, with a combined typewriting and computing machine capable of rendering a 10 per cent. item of any registered total, the incorporation of my invention renders the machine operative to automatically render computations, that include discount rates, in any multiple of 10 per cent. up to 90 per cent. by co-operating with the subtracting elements of the machine, or computations that involve flat rates of 20 cents to 90 cents, through the co-operation of either the subtracting or adding elements, or computations that involve rates as $1.10 to $1.90 per, through the co-operation of the adding elements. My key-set control of the general operator and the digit-pins provide repeating means that may be employed to co-operate with the state of the totalizer for either subtraction or addition. To run any number into a totalizer from two to nine times in succession is equivalent of multiplying that number by 2 to 9, as predetermined by the key depressed. These and a multitude of other uses that the present invention makes possible, increase the utility of the Underwood-Hanson machine by rendering possible mechanical computations that heretofore required mental calculations prior to typing operations.

Other features and advantages will hereinafter appear.

In the accompanying drawings,

Figure 1 is a vertical sectional view, through the center of a combined typewriting and computing machine, with the present improvements attached thereto, and other parts omitted for clearness.

Figure 2 is an enlarged cross-sectional view, showing in detail the key-actuated pins that are set to interlock with the lead screw driven by the general operator, and also the pin-carrier and the locking means for the pins.

Figure 3 is a sectional plan view taken on a plane indicated by the line 3—3 in Figure 1, showing one of the register-elements including the totalizer and the associated pin-bars, a section of the general operator and the driving connections to the rotatable lead screw, and also the series of repeat keys and their connections to the pins for interlocking with the lead screw.

Figure 4 is a front elevation of a section of Figure 3, showing the relative position of the series of keys that function as repeat keys to a computing mechanism, inasmuch as each key predetermines the number of cycles of the general operator.

Figure 5 is a cross-section through Figure 3, on a plane indicated by the line 5—5, showing a front view of the pin-setting mechanism operated by the keys, and the gear connections to the general operator.

Figure 6 is a view similar to Figure 5, except that the plane thereof is a little to the rear of the line 5—5 in Figure 3, to disclose parts that are obscured by parts shown in Figure 5.

Figure 7 is a detail view similar to Figure 5, except that the bell-cranks have been removed, other parts omitted, and the series of pins shown in operative relation to the latch-plate that operates to lock any pin that may have been set for operative engagement with the lead screw.

Figure 8 is a view similar in outline to Figure 5, showing the several parts in normal positions, with the clutch-elements that defeat the pin-setting movement of the general operator.

Figure 9 is a skeleton view, showing some of the parts in Figure 8 positioned by depression of one of the pin-operating keys to set up an interlock with the motor-control key, to hold the latter in a depressed state.

Figure 10 shows some of the parts of Figure 9 shifted to normal positions where the clutch for the pin-setting movement is operative, and the interlock of one part to the motor-control key is broken to release said key.

Figure 11 shows a chart, illustrating a computing operation in typing a billing work-sheet, with a diagram of the successive steps where the two totalizers become active to render a net total involving the deduction of a 10 per cent. discount from a gross total.

Figure 12 illustrates a similar computation, except that the 10 per cent. discount item has been carried into the register twice in succession to render a net total equivalent to a discount of 20 per cent.

Figure 13 shows the state of a totalizer where a 10 per cent. item is added three times in succession to render a net total equivalent to 130 per cent. or a 1.30 rate.

Figure 14 shows how a register may be employed to first set up any number therein, and, by depressing the proper "repeat" key, this number may be automatically added to itself four times to give an equivalent of multiplying the number by 5.

Alphabet-keys 15 and numeral-keys 16 depress levers 17 that are fulcrumed as a series at 18 to rock bell-crank levers 19, which are connected to swing type-bars 20 about a fulcrum 21, and the type-faces thereon will swing upwardly and rearwardly to strike the front face of a platen 22, rotatably mounted upon a carriage 23. Carriage 23 travels step by step under the control of escapement mechanism 24, which includes escapement-dogs that cooperate with an escapement-wheel 25, escapement-pinion 26 and carriage-feed rack 27. The vibratory movement for the escapement-dogs is transmitted from a universal bar 28 vibrated by each type-bar during the movement thereof toward the platen. 29 indicates a series of denominational tabulator-keys to depress key-levers 30 to thrust up decimal tabulator-stops 31 into the path of stops 32 adjustably mounted on a toothed bar 33 carried by the carriage 23. By the depression of any tabulator-key 29 to raise its associated stop 31 into the path of the adjustable stop 32 that travels with the carriage, means (not shown) are provided whereby the carriage-feed rack 27 will be lifted out of engagement with the pinion 26 by this upward setting movement of the stops 31 to release the carriage to the action of the spring-motor 34.

While the digits of a number are being typed, they may be set up on computing elements or bars 37 arranged in descending denominational order, from left to right of the machine. The computing bars are provided at their forward ends with racks 38 geared to dial-wheels 40 of a register 41, so that the set-up numbers may be transferred to, or run into, the dial-wheels.

To set up the digits of a number on the computing bars 37, each bar may be provided with a set of nine indexing devices or pins 42, having values from "1" to "9", inclusive. The indexing pins 42 may be depressed by key-actuated linkages including bars 43 to bring the lower ends of the indexing pins into the path of a cross-bar 44 of a general operator 45. Each linkage, with its pin-setting bar 43, may be connected to a rock-shaft 46 there being one rock-shaft associated with each numeral-key, and each rock-shaft being operable by an arm 47, engaged by a plunger 48 on the corresponding numeral-key 16 when the latter is depressed. The indexing pins are normally behind and out of range of the pin-setting bars 43, so that ordinarily the pin-setting bars move down between the pins 42 when the numeral-keys 16 are operated. When the carriage traverses the computing zone, the computing bars 37 will move forwardly individually into denominational order to lock the various sets of indexing pins 42 under the pin-setting bars 43. The locking of the indexing pins may be done by denomination-selecting mechanism, hereinafter described, which is actuable by the carriage 23. Each pin-bar 37 is held in its pin-setting position, while the carriage occupies the corresponding denominational position in the computing zone until a digit is typed in said position, so that the indexing pin having the value corresponding to the value of the typed digit, may be set or depressed upon the computing bar. On the return of the type-key, the carriage moves to the next denominational position, thus allowing the computing bar with the depressed indexing pin to return, while the computing bar of the next denominational order is moved to its pin-setting position, and the next digit may be typed. Thus the various indexing pins are set on the various computing bars as the digits are typed, while the carriage traverses the computing zone.

The denominational setting mechanism for moving the computing bars 37 to their pin-setting positions may comprise a dog or selector 50 mounted on a bar 51 supported on the typewriter-carriage. The selector is adjustable lengthwise of the carriage to a column of numbers to be computed, and is held in this adjusted position by a rack-bar 52. When the carriage enters the computing zone the selector is swung to its effective position by a computation controlling element in the form of a cam-roller 53, which is engaged by roller 54 on the selector, so that the selector rides up on the cam-roller to move a tappet 55 of the selector into engaging relation with a set of jacks 56 pivoted on a rod 57, and arranged from right to left in descending denominational order. The jacks 56 are operated individually as the carriage moves through the computing zone. Each jack depresses a thrust-rod 58 to operate an intermediate lever 60 associated therewith. Each intermediate lever 60 engages with a transposing device 61, to operate a bell-crank 62 about a fixed pivot 63, and move their associated bars 37 forward against their return springs 64 to its pin-setting position. Thus the computing bars 37, which are arranged in descending denominational order from left to right, are rendered effective through the transposition devices 61 by the jacks which are arranged in descending order from right to left; the jacks being so arranged that the carriage, which moves from right to left, may engage with the jacks in their proper denominational order. It will further be understood that a plurality of registers may be used, each comprising a set of computing bars 37 underlying the pin-setting bars 43; that each register may have associated therewith the computation controlling element 53, and one or more selectors 50; and that by suitable arrangement of the selectors on the carriage, the number typed in a single column may be set up on the computing bars of several registers.

After a number has been set up on the computing bars of the register, the general operator 45 may be caused to cycle by means of a motor (not shown) to run the number into the dial-wheels. This mechanism may include a key 65 arranged at the right-hand side of the machine to be depressed against the tension of a restoring spring 66, to operate a lever 67 that has suitable connections to the motor to cause a vibration of an arm 68 engaging with a fork 69 formed on the under side of the left-hand bar 70 of the general operator, the general operator being moved through this connection to run a number into the register during its forward stroke, and restore the computing bars 37 on the rearward stroke. The motor is stopped automatically at the end of each cycle, as described in the patent to A. J. Wood, No. 1,299,646, dated April 8, 1919.

The cam-roller 53 may be rendered ineffective automatically by means controlled by the general operator 45. Said means may comprise a bell-crank member 71 pivoted at 72 on a computer-frame 73. The bell-crank has a finger 74, which normally lies in a depression 75 in the left-hand guide-bar 70 of the general operator. As the general operator moves forwardly, the bell-crank member is swung about its pivot in a clockwise direction by the camming edge of the depression 75. An upwardly-extending arm 76 of said bell-crank engages a projection 77 on a link 78, to move the latter rearwardly; said link being guided at its forward end by a pivoted arm 79, and connected at its rear end to swing a bell-crank member 80 about a fixed pivot 81. The bell-crank 80 comprises an arm 82, engaging an arm 83 secured to a shaft 84, to rock the latter in a clockwise direction. On the rock-shaft 84 may be secured several bars or arms 85, each bar to support a cam-roller 53, so that all of the cam-rollers may be swung to ineffective positions against the tension of a spring when said shaft 84 is rocked.

It will be understood that the general operator is effective to render and maintain the cam-rollers ineffective while said general operator is cycled, during which time the carriage may be returned. The general operator may, however, return to its normal position before the carriage is fully restored to its initial writing position, and consequently the cam-rollers 53 would, under ordinary conditions, resume their normal effective positions. From the foregoing, it will be understood that, as the carriage 23 passes forwardly through the computing zone, a selector of the denomination-selecting means is held in its effective position by the co-operating cam-roller 53.

To lock the numeral-keys 16 so as to obviate any possibility of setting the index-pins 42 while the general operator is cycled, there may be provided mechanism like that shown in the patent to Gumprecht, No. 1,237,895, dated August 21, 1917. This mechanism may include a lever 86, which is swung about its pivot 87 by one of the cam-rollers 53 when the cam-rollers are moved to their ineffective positions by the general operator 45. The lever 86 pushes downwardly on a rod 88 to rock a bell-crank 89 to pull rearwardly a link 90. The link 90 is connected by an arm 91 to a shaft 92 to rock the latter to move a dog 93 between locking pawls 94, which prevent the depression of the numeral-keys through the intermediary of stems 95 on plungers 48.

This locking means, which prevents actuation of a numeral-key during a cycling of the general operator, will be of special value for the mechanism forming the subject-matter of this invention, as will presently be described.

The state of the machine is normally that of addition, and the machine may be set to a state of subtraction by mechanism which may be similar to that disclosed in the patent to Hanson, No. 1,278,812, dated September 10, 1918; subtraction being performed by the well-known complementary method. The machine may be set to the state of subtraction automatically or manually, as shown and described in the patent to Minton, No. 1,280,065, dated September 24, 1918. To set it manually, there is provided a key 96 at the forward end of a thrust-bar 97, which may be pushed rearwardly to rock a shaft 98 by means of an arm 99 extending upwardly therefrom and to which the thrust-bar 97 is connected. The rock-shaft is provided with a pawl 100, which normally engages in a notch 101 to hold a subtraction-setting slide or bar 102 against the tension of an operating spring 103. When the rock-shaft 98 is operated the pawl 100 is swung out of holding relation with the subtraction-setting slide 102, and consequently the latter is pulled rearwardly by the spring 103. The slide 102 is connected to rock a bell-crank 104 secured to a rock-shaft 105, pivotally supported in the computer casing. The bell-crank 104 is connected to swing a universal bar 106 about a pivot 107 by means of an arm 108 on said bar 106. The universal bar 106 shifts the rock-shafts 46 to connect them with the pin-setting linkages 43, having values corresponding to the complements of the rock-shafts. Consequently, the numeral-keys 16 when depressed, while the machine is in a state of subtraction, are effective to set the pins having values corresponding to the complements of the numeral-keys, and as a result the complement of a number being typed is set up on the pin-bars, which may then be run into the register by means of the general operator.

The subtraction-setting slide 102 will be restored to its normal position by means of the cross-bar 44 of the general operator, which engages during its forward stroke the projection 109 on the lower edge of the subtraction-setting slide 102, to push the latter forwardly. After the subtraction-setting slide has been restored the pawl 100 again snaps into the notch 101 through the action of a spring not shown.

Among other functions, the general operator 45, on its return stroke restores all the set pins 42 to their normal raised positions, so that they will be ready to accumulate a subsequent computation. For this purpose, there is provided on the general operator a pawl 110, which is pivoted to swing idly past an arm 111 on a rock-shaft 112 during the forward motion of the general operator. A spring 113, however, returns this pawl 110 to its normal position, so that, on the return stroke of the general operator the pawl 110 will act as a cam, and swing the arm 111 upwardly thereby rocking the shaft 112 and an arm 114 to engage and raise a pin-restoring plate or platform 115, which will raise all the set pins 42. The pin-restoring plate 115 is supported for parallel motion by means of two pairs of bell-crank levers 116, connected for parallel motion by one or more links 117.

The description up to this point, includes such parts of the standard Underwood-Hanson bookkeeping machine as is necessary for an understanding of the present invention, and the assembly and adaptation of the new mechanism to existing mechanisms in said machine.

The present invention provides for a series of push-keys 116ᵃ at the front of the computer base 73 that co-operate with a computing mechanism. If the computing machine includes two or more separate computing mechanisms, there will be arranged at the front wall of the casing two or more sets of keys; but, for the purpose of describing the present invention, only one set of keys will be shown and described in operative relation to one computing mechanism. These keys, as shown, are eight in number arranged in two banks in staggered relation, and each key 116ᵃ includes a head that may be inscribed with numerals, as 20 to 90, to indicate eight multiples of ten, and may represent percentage, or single numerals as 2 to 9 employed to indicate multiples from 2 to 9, or the keys may be considered "repeat" keys, the numerals 2 to 9 thereon indicating the number of times a numeral set up in the computing mechanism may be repeated automatically without resetting the pin-bars each time. The key-heads 116ᵃ are formed with shanks to receive the forward ends of push rods 117ᵃ that take bearings in holes through the front wall of the casing 73, and also take bearings at their inner ends in an angle plate 118 secured to the base section 119 of a frame 120, secured to the side wall of the main frame 73, by screws 121. The inner free end of each rod 117 carries a square block 122, that nests within the angle of the plate 118 to promote a sliding movement thereof under a key-action, and serves as a stop for the return movement of each key under the influence of a spring 123 adjustably arranged upon each rod 117ᵃ. Each block 122, is formed with a cam-face 124, to engage with an arm 125, forming a part of a bell-crank 126 mounted for vibration, as a series, upon a fulcrum rod 126ᵃ, and provided with spacing washers 127 to hold each arm 125 and bell-crank in vertical alignment with the cam-blocks 122, and springs 128 maintain a contact between said arms and cam-blocks.

The frame 120 includes the base section 119, and two upstanding side sections that are tied together by two bars 129 arranged in parallel relation and secured between the two side sections by screws that thread into the ends of the bars. Each bar 129 has a longitudinal tongue 130 that provides for a guiding and sliding movement for a carrier 131 formed with longitudinal grooves to receive both tongues. The carrier 131 has a free reciprocating movement along the tongues and bars 129, but is spring-pressed to normal position by a spring 132, having one end secured to the carrier, and the other end secured to the frame; the normal position of the carrier being determined by the abutment of the end thereof against the side section of the bracket 160.

The carrier 131 has a series of pins 133 positioned to align with the bell-cranks 126. These pins, as shown at Figure 2, slide through holes 134 in the carrier, a section of each hole having been counterbored to form a spring-chamber 135, to house a spring 136 that is compressed between the end of the chamber and a shouldered portion 137 of each pin 133, and to retain said pin in normal position under pressure, a plate 138 is removably secured to the carrier, against which the shouldered portion 137 of each pin bears. Each pin 133 passes through a hole in the plate 138 and projects from the face thereof to be engaged by a bell-crank 126, which, when vibrated by the cam-block 122, moves the pin rearwardly to project the free end beyond the carrier 131 to interlock with means, to be described; the shoulder 137, during this pin-movement compressing the spring 136.

It is desirable that when the pin is projected, as just described, it be locked in its depressed position during a predetermined interval, but as the release of the actuated key 116$^a$ withdraws the cam-block 122, and releases the bell-crank to the action of the spring 128, latching means are required to hold each pin in its projected state. This means may include a plate 139, having a sliding contact with the face of the plate 138, and secured thereto for a sliding movement by a pair of screws 140 that pass through diagonal slots 140$^a$ in the plate 139, and thread into the plate 138. The plate 139 has a clearance hole 141 longitudinally of the plate, through which the forward free ends of all the pins 133 pass. The lower edge of the slot 141 is beveled to form a sharp angular edge, and the plate 139 is provided with a lifting and drawing movement, through the angular relation of the two slots 140$^a$ to the fixed screws 140 by springs 142, having one end secured to the plate and the other end secured to the screws 140. When the plate 139 is released to the action of the springs 142, the beveled edge is brought into contact with the whole series of pins 133; said pins having two ratchet-shaped grooves 143 and 143$^a$ to receive the beveled edge of the slot 141; and said edge functions to enter one groove 143 to lock a pin in its projected state, and to enter the grooves 143$^a$ of all the remaining pins, to provide means to release any key depressed by error, as by subsequently depressing the correct key 116$^a$, which first depresses the plate by the camming action of its groove 143$^a$ riding over the beveled edge of the slot 141, which releases the first key from its interlock with the plate 139, and subsequently interlocks with the groove 143 of the second depressed key, or a key depressed by error may be released by partially depressing any key until the straight section of the pin between the two grooves 143 and 143$^a$ engages with the beveled edge of the plate for a releasing position.

The lower edge of the plate 139 has a ledge 144 formed therewith to underlie a pin 145 carried at the end of a crank-arm 146, secured to a rock-shaft 147, having a bearing in an ear on the lower bar 129, and a turned-up ear 148 of the base section 119.

A bell-crank mounted on the shaft 147 comprises an arm 149 that rises to the plane of the pins 133, when they are projected by the bell-cranks 126, and a second arm 150 that extends horizontally to the right hand where the free end enters an open slot in the end of a lever 151 positioned at right angles to said arm 150 to convey a vibratory up or down motion to said arm. The lever 151 is fulcrumed upon the rod 126$^a$ outside the series of bell-cranks 126, and formed with an arm 152 extending forwardly of the fulcrum 126$^a$ and with a similar arm 153 at the opposite side of the bell-cranks 126, and a vibratory frame is formed by a tie-rod 154 joining the ends of the two arms 152 and 153 together. The relation of these parts is such, that the rod 154 will overlie the top edges of all the crank-arms 125, and becomes a universal bar to be vibrated by each bell-crank 126 when actuated by the key-operated cam-block 122, to vibrate the lever 151 to vibrate the bell-crank arm 150, which in turn rocks the shaft 147 to vibrate the crank-arm 149. It will be noted that the transmission from the rod 154 provides for two stop positions for the crank-arm 149, a normal position shown in Figure 8, and an active position shown in Figure 9, and, to maintain these two positions against accidental displacement, a two-way spring-detent is secured to the extreme rear end of the rock-shaft 147 including an arm 155 with a V-shaped terminal, to co-operate with a V-shaped flat spring 156 secured to the frame. The reaction of the spring 156 in Figure 8 tends, through the intermediate connection, to hold the rod 154 against the arms 125, and the reaction of the spring in a reverse direction is checked by a pin 157, when the parts are in operative position, as shown in Figure 6. As already described, the carrier 131 has a series of eight pins 133 that may be projected rearwardly by the key-actuated bell-cranks 126 and locked. To co-operate with these eight pins, a worm or lead screw 158 is positioned to the rear of the carrier 131, with an open space between them, to allow for a free vibration of the arm 149; the axis of said screw 158 is in horizontal alignment with the plane of the pins 133 and is parallel to the pin-carrier 131. Said lead screw is secured to a shaft 159 fulcrumed at one end at the top end of a side wall of the frame 120 and the opposite end to a bracket 160 secured to the base section 119 of the frame.

This lead screw 158, as clearly shown at Figure 3, comprises square threads, the pitch thereof being equal to the spacing of the pins 133 in the carrier 131 and adjusted at the normal position, so that each pin 133 when projected will enter the spiral groove between two adjoining threads, and hence, when a pin is so projected into engagement between two threads of the screw, the screw becomes a leading or driving element, and the pin becomes a follower, and by following the spiral groove of said screw the pin 133 forces the carrier 131 as a unit to move longitudinally of the screw and against the tension of the carrier-restoring spring 132.

When a key 116ª is depressed, the associated bell-crank 126 will project a pin to bridge the gap separating the carrier 131 from the lead screw 158 and enter the spiral groove of said screw. Simultaneously with the depression of the key 116ª, the universal bar 154 over the arms 125 will rock the shaft 147 and raise the arm 149 from the position of Figure 8 to the position of Figure 9, at which time the upper free end of said arm will present a vertical edge face within the path of the pin 133 which is engaging the lead screw 158, and hence, when said screw causes the pin to travel therewith, said pin will in time reach the position of the upper end of the arm 149 and the continued movement of the pin will vibrate said arm to a point where the two detent elements 155—156 will have passed a common center, and the detent spring 156 will finish the operation of vibrating the arm 149 to normal position. The rocking of the shaft 147 rocks the arm 146, and, through the engagement of the pin 145 with the ledge 144, the plate 139 is drawn down and the interlock between the beveled edge of the slot 141 will be broken and the pin 133 will respond to the influence of its spring 136 and withdraw itself from the lead screw 158.

Thus, the projection of a pin 133 into mesh with the lead screw 158, and the pin being subsequently restored automatically by its own motion, constitute an automatic timing element, where the position of the pin projected predetermines the distance to be traveled by the pin; and as the pitch of the lead screw equals the spacing of the pins 133 every cycle of said screw displaces the active pin one pin-space distance, and hence the interval of activity for each pin is predetermined by the number of successive cycles of said screw before the pin automatically withdraws itself from the screw. Thus, if the pin of lowest order were projected, one cycle of the screw would release the pin from the screw, but for purposes that will presently appear a single pin-driving cycle is not desired. The lowest pin-set operation is indicated by the key 116ª for lowest order and marked "20", which may be interpreted as indicating that a two-cycle movement of the screw is desired when the associated pin 133 is projected into the screw; the pin moving one cycle distance before it contacts with the arm 149. This is true of all the key actions up to "90", when the pin will travel with the screw eight cycles and the restoring means becomes effective during the ninth cycle of the screw.

It is well known that the set-up digit-pins 42 are restored by the pin-setting platform 115, and that, when the pins are conditioned for subtraction, the subtraction-setting means are restored by the forward movement of the general operator, and the values of the pin-bars run into the totalizer by the same movement, and hence, were the pin-restoring platform disabled, so that the digit-pins remain set, it is evident that one setting of the pins by the key would enable a plurality of "repeat" operations to be entered into a totalizer for either addition or subtraction.

To this end the arm 114, instead of being fixed to the rock-shaft 112, is loosely mounted thereon and driven by a well-known tongue-and-groove clutch construction, where the tongue may be a part of the arm 114 and the groove a part of a collar 161 fixed to the shaft 112. Thus by shifting the arm 114 along the shaft 112 to separate the clutch members, said arm remains inactive during the interval the general operator ineffectively rocks the shaft 112. To effect this sliding movement of the arm 114 and time the movement of other parts, said arm is formed with a hub 162 formed with a groove to receive the forked end of a lever 163 secured to the rock-shaft 147. When the shaft 147 and the parts thereon are rocked from the positions shown in Figure 8 to the positions shown in Figure 6, where a pin 133 has been projected into the control of the lead screw, the clutch elements between the arm 114 and the collar 161 have been separated, and hence, during the interval of longitudinal movement of the active pin 133, the clutch will remain open and any computations that are run into the register during this interval must necessarily be "repeat" operations, because the pin-setting plate cannot function; but during the last cycle of the screw 158, the arm 149 is vibrated by the pin 133, the clutch elements are brought into re-engagement by the rocking of the shaft 147, and the general operator in due time on its return stroke will rock the shaft 112 and vibrate the arm 114 to lift the platform 115 for a pin-restoring movement.

To maintain the clutch member of the arm 114 in operative alignment during its inactive state, a bracket 164 is secured to the under face of the pin-setting platform 115 and formed with a tongue to underlie the arm 114.

As already described, the lead screw 158 has a cycle of motion equivalent to the spacing of the pins 133, and hence said screw must start and end a cycle at the same point. The shaft 159 carries a disk 165 formed with a peripheral detent to cooperate with a spring-pressed roller 166 secured to the guide-bar 129 to ensure a fixed starting and stopping position for the lead screw 158, so that the spiral grooves of the screw will align with the location of the pins 133.

It is apparent that the direction of rotation for the lead screw 158 must be positive, and, as said screw is rotated by a gear 167 loose on the shaft 159, a spring-pressed ratchet-pin 168 is housed within the end of the screw 158 to engage within a depression 169 in the adjacent side face of the gear 167, to provide a one-way driving means for said gear.

The right-hand rack-bar 70ª of the general operator is in train with a pinion 170 journaled on the frame 73, which, in turn, meshes with the teeth of a sector 171 fixed to a rock-shaft 172 journaled in the frame. The rock-shaft 172 carries a second gear sector 173 that drives the gear 167 by the reciprocatory movement of the general operator. The general operator may be operated by the usual operating lever, but for the purposes of the present invention it is desirable that said operator be motor driven, as already described, by the depression of the key 65, but, as this key is immediately restored by the spring 66, a second cycle of the motor would be impossible without manually holding the key depressed, which would defeat the purpose of the present invention.

The rock-shaft 147 carries an upright arm 174 with the upper end pivoted to a link 175, which pitches downwardly and terminates at a horizontal section that slides through a suitable slot in the bracket 160 and carries a spring-pressed latching pawl 176. The rocking of the shaft 147 to the position shown in Figure 10 shifts the pawl 176 clear of the lever 67, but, when the shaft 147 and the several parts thereon are shifted to the positions shown in Figure 6, said pawl will abut the face of the lever 67, as shown, under tension, and when the lever is depressed to the motor-starting position by the key 65, the pawl 176 will snap over the top edge of said lever 67 and maintain the motor-starting elements for continuous cyclings of the motor until the movement of the pin 133 rocks the shaft 147 to normal position, when the pawl 176 will be withdrawn from its latching position over the lever 67, and the motor-starting means will become inoperative at the end of the cycle.

The relation of the motor drive to the general operator and the general operator to the lead screw is such that each has a single cycle of movement, and when the motor drive is conditioned for two or more successive cycles, the general operator will have a similar number and transmit a similar number to the lead screw.

From this description, it will be noted that when a "30" key 116ª is depressed the mechanism described will set up a controlling mechanism to effect three successive movements of the general operator to register a set-up item three successive times for either subtraction or addition; that any multiple from 2 to 9 may be effected by the depression of the proper key; that while a series of eight keys is shown it is obvious that the number may be increased indefinitely; that the depression of the "30" key, co-operating with a subtraction-set totalizer, will give a final total equivalent to a discount of 30 per cent., or by depressing the "70" key with the totalizer set for addition the same result may be obtained; that if an error is made by depressing a wrong key 116ª, the error may be corrected by the subsequent depression of another key, which automatically restores the first key; that when the starting key 65 is depressed, an interlock, established by the depression of any key 116ª, is effective to hold said key in a depressed state for an interval of two or more successive cycles, and finally released by means operated by the general operator; and that the lead screw 158 functions as a timing element when the interval of operative transmission therefrom is predetermined by the co-operative key-set pins 133.

Referring to the chart of Figure 11, 177 indicates the computing end section of a work-sheet where detailed items have been typed to the left thereof and the gross totals 178 for each item is typed in column 1. This column 1 shows four items entered therein, and each of these items has been successively entered into registers No. 2 and No. 3 for addition. Both registers are connected in tandem, as shown and described in the patent to Becker, No. 1,296,354, dated March 4, 1919, and will disclose the same total 179. Both registers are set for a set of subtraction, and the column selector for register No. 3 is offset one denominational unit or letter-space distance for an item of 10 per cent. of the total 179. Hence in typing the total in column 2, the total 179 will be subtracted from the register No. 2 to "clear" this register, and the 10 per cent. item 180 will be deducted from the total exhibited by the register No. 3. The stated discount may be entered as shown and the work-sheet denominationally spaced for the entries in the third column. In typing the final result 181 in the third column, the register No. 3 is still set for subtraction, hence the total 181 will be deducted from the register No. 3 to "clear" the wheels.

At Figure 12 the same registers are employed and the same numerals shown as used in Figure 11. The computation includes a discount rate of 20 per cent. Prior to the operation of typing the amount in column 2, the "20" key 116ª, associated with the register No. 3 only, is depressed, which projects its pin 133 into engagement with the lead screw 158 and sets the latching pawl 176 into the position of Figure 6, and the two clutch elements for the arm 114 are separated as shown. In typing the amount 179 in column 2, the pins are set up on the pin-bars, and both registers having been set for subtraction by the key 96, depression of the starting key 65 sets the motor cycling to deduct the amount from the register No. 2 to "clear" and deduct 10 per cent. from the total of register No. 3. The register No. 2, having no "repeat" keys 116ª, becomes inactive at the end of the first cycle of the motor, but the restoration of the pins 42 having been defeated by the inoperative connections to the arm 114 at the end of the first cycle of the motor and general operator, these pins remain in their set positions. The starting key 65 having been latched down in motor-releasing position, the motor, instead of being cut out at the end of the first cycle, continues for a second cycle to deduct the 10 per cent. item a second time from the register No. 3. In the meanwhile the pin 133 has been shifted by one cycle of the lead screw 158, and during the second cycle of said screw the pin will engage the arm 149 to rock the shaft 147 to re-establish the clutch members for the arm 114 and withdraw the latching pawl 176 from the lever 67, to release the key 65 to its restoring spring 66, as shown in Figure 10. This provides that the return movement of the general operator will function to restore the pins 42, and the motor will be ineffective at the end of its second cycle. This operation gives a total after two 10 per cent. items have been deducted, which total is an equivalent to a 20 per cent. discount. In typing this result in column 3, the register No. 3 will be "cleared" as before.

Figure 13 shows a computation similar to that of Figure 12, except that the register No. 3 is conditioned for addition and the "30" key 116ª is depressed to successively add the 10 per cent. item to the registered total in register No. 3, which gives a result that may be rendered as 130 per cent., or as a charge rate of $1.30 per thousand, and a mental transposition of the decimal point is required to type the result in dollars and cents.

Figure 14 illustrates a register within which any number may be entered, and that number successively added to itself a plurality of times for a final product. In this figure, the "40" key 116ª is depressed to predetermine a fifth multiple of the figure, and illustrates how any number may be multiplied by 2 to 9 automatically, or to higher multiples by increasing the number of key 116ª.

It will be seen that this invention is also useful for example in calculating bills for consumption of gas, as set forth in the co-pending application of W. E. Torfs, No. 552,608, filed April 14, 1922 (now patent No. 1,709,963, dated April 23, 1929), and also the co-pending Torfs Patent No. 1,548,070. In said Torfs cases, an auxiliary register displays an amount equal to ten per cent of the amount that is displayed in the main register. By the present invention, the amount so displayed in said auxiliary register may be multiplied by two, three, four, five, six, seven, eight or nine, by operating the corresponding key at Figure 4 marked 20, 30, 40, 50, 60, 70, 80, or 90; the key marked "20" causing the general operator to cycle only once, the key marked "30" causing it to cycle only twice, and so on, the key marked "90" causing it to cycle only eight times. Thus the gas bill of the Torfs cases can be calculated mechanically at any rate from 10 cents, 20 cents, 30 cents and so on, up to $1.90 per thousand feet. The use of the invention is not limited to denominations of tenths or hundredths, as it is obviously useful also for calculating units, tens, and so on.

Upon the keys 116ª, each numeral sign means a multiple of ten. The first key signifies 10 times 2. The second signifies 10 times 3, and so on. There are only eight of these keys. The general operator cycles one less time than is indicated by the selected key 116ª. This shortness of cycling is necessary, because the original number has been already carried into the totalizer once before any key 116ª is selected for operation. For example, if the number "63" appears in the totalizer, the operator may press the key "40" (which is 4 times 10) and the general operator will thereupon cycle not four times, but three, so that the totalizer will finally exhibit "252."

Operations described for Figures 11 to 14 have been based upon some multiple of ten, for an illustration, but from the foregoing description it is obvious that discounts of either less or more than ten per cent may as readily be computed. For further example, in computing a one per cent discount the normal position of the decimal point should be at the required place. To compute a two per cent discount (as customarily allowed for cash payments) the first of the keys 116ª is depressed, which operates, as already described, to repeat the previously ascertained one per cent unit. Any of the other keys 116ª may be operated to compute desired multiples of this one per cent unit. Each of the keys 116ª should bear a designation (for example 4, or 40, or 400, or the like) which indicates a multiplier that is one higher than the number of additions that will be made by the general operator. For example, if a key marked "4", or "40" is operated, the general operator will cycle three, not four, times.

The use is also obvious that compounded discounts such as "20 less 5" may be computed by first establishing a net total for the twenty per cent discount, as already described, and then from this net total deducting a one per cent unit five times.

Thus a machine is presented for typewriting items and exhibiting their total, and multiplying said total by a selected multiple of one-tenth when typing said total upon a bill, the machine including registers No. 2 and No. 3, and also including key-controlled indexing devices for each register and a general operator for running into the registers the numbers indexed by the keys, No. 2 register exhibiting the total of the items charged in column or zone 1 upon the bill, the same total being automatically entered into register No. 3, means called into action by copying said total in column 2 upon the bill for setting the index-devices in said register 1 preparatory to clearing the same, means for simultaneously and automatically setting index-devices for register No. 3 to represent an amount equal to ten per cent of said total copied in column 2 on the bill from the register No. 2, means for conditioning register No. 3 for subtraction, selective means 116$^a$, co-operative with the general operator and the indexing devices of register No. 3, for causing the general operator to repeat the decimal which has been so indexed in the register No. 3, concomitantly with the subtraction of said total from the register No. 2 by the general operator, whereby the multiplied decimal product is exhibited in the register No. 3 at the same time that register No. 2 is cleared, and means dependent upon typing the decimal product, then exhibited by the register No. 3, into another column upon the bill, for returning register No. 3 to zero.

Variations may be resorted to within the scope of the invention, and portions of the improvements may be used without others.

Having thus described my invention, I claim:

1. In a combined typewriting and computing machine, the combination of a computing mechanism including a general operator, driving mechanism for the general operator, starting means for the driving mechanism, a lead screw rotated by the general operator, drive-controlling pins to interlock selectively with the lead screw and be moved thereby to render the driving means ineffective, and a key to actuate each pin for an interlocking engagement with the screw.

2. In a combined typewriting and computing machine, the combination of a computing mechanism including a general operator, driving mechanism for the general operator, starting means for the driving mechanism, a lead screw rotated by the general operator, pins to interlock with the lead screw and be moved thereby, said driving mechanism controlled by said pins and means operated by the movement of any interlocking pin to determine the number of cycles of the general operator before the driving means is rendered ineffective by the pin.

3. In a combined typewriting and computing machine, the combination of a computing mechanism, including a general operator, a lead-screw connectible to cycle a unit of distance for each cycle of the general operator, a series of keys, a traveling carrier normally inoperative, and a series of pins movable with the carrier that are selectively depressible by the keys into interlocking engagement with the lead-screw, whereby the carrier will be driven in unison with the lead-screw to determine the number of cycles for the general operator.

4. In a combined typewriting and computing machine, the combination of a computing mechanism, including a general operator, a lead-screw connectible to cycle a unit of distance for each cycle of the general operator, a series of keys, a traveling carrier normally inoperative, a series of pins movable with the carrier that are selectively depressible by the keys into interlocking engagement with the lead-screw, whereby the carrier will be driven in unison with the lead-screw to determine the number of successive cycles for the general operator, and means to hold a depressed pin in its operative interlock with the lead-screw during a predetermined travel of the carrier with said screw.

5. In a combined typewriting and computing machine, the combination of a computing mechanism, including a general operator, a lead-screw connectible to cycle a unit of distance for each cycle of the general operator, a series of keys, a traveling carrier normally inoperative, a series of pins movable with the carrier that are selectively depressible by the keys into interlocking engagement with the lead-screw, whereby the carrier will be driven in unison with the lead-screw to determine the number of successive cycles for the general operator, means to hold a depressed pin in its operative interlock with the lead-screw during a predetermined travel of the carrier with said screw, and means to automatically release any depressed pin of its interlock with the lead-screw at a fixed point in the travel of the carrier.

6. In a computing machine, the combination with a readable totalizer, of means including a general operator for registering a number therein, and means including controlling keys having numeral signs thereon for selectively causing said general operator to subsequently add the already once-registered number into said register a number of times which is one less than the number which is indicated by or understood from the sign on the selected key.

7. In a combined typewriting and computing machine, the combination of a computing mechanism including a general operator, driving mechanism for the general operator, starting means for the driving mechanism, a lead screw rotated by the general operator, a series of pins movable into engagement with said screw to be moved thereby a carrier for the pins reciprocable parallel to the screw, keys to set the pins, mechanism operated by each key to prevent the restoring of the starting means during the first cycle of the driving means, and means operative during the reciprocation of a pin by the screw to release the starting means during the last predetermined cycle of the driving means.

8. In a computing machine, the combination of a totalizer, reciprocating rack-bars carrying displaceable index-pins, a general operator to reciprocate the bars to transfer the displaced pin values to the totalizer, pin-restoring means operated by the general operator, and selective key-actuated mechanism to automatically disable the pin-restoring means operated by the general operator for a predetermined number of successive cycles thereof.

9. The combination of computing mechanism including a totalizer, reciprocating rack-bars carrying displaceable index-pins, a general operator to reciprocate the bars to transfer the displaced pin values to the totalizer, pin-restoring means operated by the general operator, an element rotated by the general operator, and a plurality of keys selectively operable to disable the pin-restoring means operated by the general operator and co-operate with said rotated element to predetermine the interval the pin-restoring means is inactive.

10. The combination of a totalizer, reciprocating rack-bars carrying displaceable index-pins, a general operator to reciprocate the bars to transfer the displaced pin values to the totalizer, pin-restoring means normally operated by each movement of the general operator, a lead screw rotatably connected to the general operator, means operative to disable the pin-restoring means, a series of keys individually connected to operate the disabling means, and other mechanisms individually operable by said keys to co-operate with the lead screw to variably determine the interval the pin-restoring means shall remain inactive.

11. The combination of computing mechanism including a totalizer, reciprocating rack-bars carrying displaceable index-pins, a general operator to reciprocate the bars to transfer the displaced pin values to the totalizer, pin-restoring means normally operated by each movement of the general operator, a lead screw rotated by the forward movement of the general operator, means operative to disable the pin-restoring means operated by the general operator including clutch-elements, a series of keys individually operable to separate the clutch-elements, and other mechanism set up by the keys to interlock with the lead screw and travel a predetermined interval therewith, and then automatically effect a restoration of the control of the pin-restoring means to the general operator by rendering the clutch-elements effective.

12. The combination of computing mechanism including a totalizer, reciprocating rack-bars carrying displaceable index-pins, a general operator to reciprocate the bars to transfer the displaced pin values to the totalizer, pin-restoring means normally operated by each movement of the general operator, a lead screw rotated by the forward movement of the general operator, means operative to disable the pin-restoring means operated by the general operator including clutch-elements, a series of keys individually operable to effect a separation of the clutch elements, and other mechanism operated by the keys including individual bell-cranks that project individual pins to interlock with said lead screw and travel therewith to determine the inactive interval for the pin-restoring means.

13. The combination of a totalizer, reciprocating rack-bars carrying displaceable index-pins, a general operator to reciprocate the bars to transfer the displaced pin values to the totalizer, pin-restoring means normally operated by each movement of the general operator, a lead screw rotated by the forward movement of the general operator, means operative to disable the pin-restoring means operated by the general operator including clutch-elements, a series of keys individually operable to effect the separation of the clutch-elements, and other mechanism operated by the keys including individual bell-cranks and bell-crank-actuated pins individually projectible to interlock with the lead screw and releasably set to travel therewith to determine the inactive interval for the pin-restoring means.

14. The combination of a totalizer, reciprocating rack-bars carrying displaceable index-pins, a general operator to reciprocate the bars to transfer the displaced pin values to the totalizer, pin-restoring means normally operated by each movement of the general operator, a lead screw rotated by the forward movement of the general operator, means operative to disable the pin-restoring means operated by the general operator including clutch-elements, a series of keys individually operable to effect the separation of the clutch-elements, and other mechanism operated by the keys including individual bell-cranks and bell-crank-actuated control pins individually settable to interlock with the lead screw.

15. The combination of a totalizer, reciprocating rack-bars carrying displaceable index-pins, a general operator to reciprocate the bars to transfer the displaced pin values to the totalizer, pin-restoring means normally operated by each movement of the general operator, a lead screw rotated by the forward movement of the general operator, means operative to disable the pin-restoring means operated by the general operator including clutch-elements, a series of keys individually operable to effect the separation of the clutch-elements, and other mechanism operated by the keys including individual bell-cranks and bell-crank-actuated pins individually settable to interlock with the lead screw and driven thereby to a fixed point where the active pin operates to restore clutch-elements and the pin-restoring means to the control of the general operator.

16. The combination of a totalizer, reciprocating rack-bars carrying displaceable index-pins, a general operator to reciprocate the bars to transfer the displaced pin values to the totalizer, pin-restoring means normally operated by each movement of the general operator, a screw rotated by the general operator, a plurality of keys, a plurality of bell-cranks operated by the keys, a reciprocable carrier, pins for the carrier which are settable by the bell-cranks to engage with the screw, and a universal bar operated by any key-actuated bell-crank and connectible to the index-pin-restoring means to disconnect said means from the control of the general operator during the interval the active pin in the carrier is moving to a pin-restoring position.

17. The combination of a totalizer, reciprocating rack-bars carrying displaceable index-pins, a general operator to reciprocate the bars to transfer the displaced pin values to the totalizer, pin-restoring means normally operated by each movement of the general operator, a screw rotated by the general operator, a plurality of keys, a plurality of bell-cranks operated by the keys, a reciprocable carrier, normally inoperative pins for the carrier which are settable by the bell-cranks to engage with the screw, a universal bar operated by any key-actuated bell-crank, connections operated by the universal bar to disconnect the index-pin-restoring means from the general operator, and means operated by the set or active pin in the pin-carrier during its travel, to restore said active pin and release the pin-restoring means to the control of the general operator.

18. The combination of a totalizer, a general operator, driving mechanism for the general operator, key-actuated means to start the driving mechanism, pin-bars carrying displaceable index-pins to be operated by the general operator, index-pin-restoring means operated by the general operator, and key-actuated means operative to disable the operation of the index-pin-restoring means by the general operator during the first cycle thereof, and subsequently become automatically effective to restore the pin-restoring means to the control of the general operator during the second cycle of the general operator.

19. The combination of a totalizer, a general operator, driving mechanism for the general operator, key-actuated means to start the driving mechanism, pin-bars carrying displaceable index-pins to be operated by the general operator, index-pin-restoring means operated by the general operator, key-actuated means operative to disable the operation of the index-pin-restoring means by the general operator during the first cycle thereof, other mechanism operated by the same key to prevent the restoring of the starting means during the first cycle of the driving mechanism, and mechanism operated by the general operator and effective to automatically restore the pin-restoring means to the control of the general operator and release the driving mechanism starting means during the last predetermined cycle of the general operator.

20. The combination of a totalizer, a general operator, driving mechanism for the general operator, key-actuated means to start the driving mechanism, pin-bars carrying displaceable index-pins to be operated by the general operator, index-pin-restoring means operated by the general operator, an element rotated by the general operator, key-actuated means operative to prevent the operation of the index-pin-restoring means by the general operator, other means operable by the same key to engage with said rotated element to predetermine the number of successive cycles for the general operator, other mechanism operable by the same key to prevent the restoring of the starting means during the first cycle of the driving mechanism, and means co-operative with said rotated element to automatically restore the pin-restoring means to the control of the general operator and release the driving mechanism starting means during the last predetermined cycle of the general operator.

FREDERICK U. CONARD.